(12) United States Patent
Kashani et al.

(10) Patent No.: US 12,045,353 B2
(45) Date of Patent: Jul. 23, 2024

(54) SYSTEM AND METHOD FOR ENHANCING VEHICLE OCCUPANT VOICE DATA PRIVACY

(71) Applicant: Denso Corporation, Kariya (JP)

(72) Inventors: Ameer Kashani, Southfield, MI (US); Gopalakrishnan Iyer, Santa Clara, CA (US)

(73) Assignee: Denso Corporation (JP)

( * ) Notice: Subject to any disclaimer, the term of this patent is extended or adjusted under 35 U.S.C. 154(b) by 489 days.

(21) Appl. No.: 16/425,136

(22) Filed: May 29, 2019

(65) Prior Publication Data
US 2020/0380139 A1 Dec. 3, 2020

(51) Int. Cl.
| | |
|---|---|
| G06F 21/60 | (2013.01) |
| G06F 21/62 | (2013.01) |
| G10L 15/08 | (2006.01) |
| G10L 15/22 | (2006.01) |
| H04L 9/08 | (2006.01) |
| H04R 3/00 | (2006.01) |

(52) U.S. Cl.
CPC ........ *G06F 21/602* (2013.01); *G06F 21/6245* (2013.01); *G10L 15/08* (2013.01); *G10L 15/22* (2013.01); *H04L 9/0825* (2013.01); *H04L 9/0894* (2013.01); *H04R 3/00* (2013.01); *G10L 2015/088* (2013.01); *G10L 2015/223* (2013.01)

(58) Field of Classification Search
CPC ... G06F 21/602; H04L 9/3231; H04L 9/0825; H04L 2209/84
USPC .......................................................... 713/193
See application file for complete search history.

(56) References Cited

U.S. PATENT DOCUMENTS

| | | | |
|---|---|---|---|
| 5,812,067 A | 9/1998 | Bergholz et al. | |
| 6,952,155 B2 | 10/2005 | Himmelstein | |
| 9,735,790 B2* | 8/2017 | Sai | H04L 27/152 |
| 2002/0067245 A1* | 6/2002 | Campbell | G07C 9/37 |
| | | | 704/E15.045 |
| 2002/0181442 A1* | 12/2002 | Rajani | H04L 12/5692 |
| | | | 370/352 |
| 2004/0220798 A1* | 11/2004 | Chi | G10L 17/22 |
| | | | 704/201 |
| 2005/0242923 A1* | 11/2005 | Pearson | G07C 9/00309 |
| | | | 340/5.62 |
| 2011/0010435 A1* | 1/2011 | Okaya | H04N 21/4341 |
| | | | 709/219 |
| 2011/0015808 A1* | 1/2011 | Dreier | F16H 59/52 |
| | | | 701/2 |
| 2013/0104203 A1* | 4/2013 | Davis | G06F 21/316 |
| | | | 726/5 |

(Continued)

FOREIGN PATENT DOCUMENTS

| | | |
|---|---|---|
| EP | 0761514 A1 | 3/1997 |
| JP | 2012500526 A | 1/2012 |

(Continued)

*Primary Examiner* — Teshome Hailu
(74) *Attorney, Agent, or Firm* — Dickinson Wright PLLC

(57) ABSTRACT

A microphone controller includes a processor programmed to receive voice input from one or more microphones to be utilized in a voice recognition session initiated by the microphone controller. Further the microphone controller includes a key store including one or more keys configured to encrypt the received voice input to an encrypted voice data.

19 Claims, 3 Drawing Sheets

(56) References Cited

U.S. PATENT DOCUMENTS

| | | | | |
|---|---|---|---|---|
| 2014/0143839 A1* | 5/2014 | Ricci | H04N 21/814 | 726/4 |
| 2014/0303837 A1* | 10/2014 | Tuukkanen | B60R 16/0231 | 701/36 |
| 2014/0325236 A1* | 10/2014 | Kim | G06F 21/62 | 713/189 |
| 2015/0338917 A1* | 11/2015 | Steiner | H04L 9/3271 | 345/156 |
| 2016/0006710 A1* | 1/2016 | Palme | H04L 63/045 | 380/260 |
| 2016/0357187 A1* | 12/2016 | Ansari | G01S 13/862 | |
| 2016/0364679 A1* | 12/2016 | Cao | G06Q 50/30 | |
| 2016/0364812 A1* | 12/2016 | Cao | G06Q 50/30 | |
| 2019/0041485 A1* | 2/2019 | Bhat | H04W 12/63 | |
| 2019/0080698 A1* | 3/2019 | Miller | G10L 17/22 | |

FOREIGN PATENT DOCUMENTS

| | | |
|---|---|---|
| JP | 2017146437 A | 8/2017 |
| JP | 2018517919 A | 7/2018 |
| WO | 2017165807 A1 | 9/2017 |

\* cited by examiner

SYSTEM AND METHOD FOR ENHANCING VEHICLE OCCUPANT VOICE DATA PRIVACY

TECHNICAL FIELD

The present disclosure relates to a voice recognition engine and voice data.

BACKGROUND

Vehicles may be equipped with one or more microphones for collecting voice data. The captured voice data may be utilized in numerous applications, such as a phone call using a telematics module, a phone call utilizing a paired mobile phone, voice commands for a navigation system, voice commands for virtual assistants, etc. Consumers may be concerned about privacy of such data.

SUMMARY

According to one embodiment, a vehicle computer system includes one or more microphones configured to receive voice input, a microphone controller configured to receive the voice input and utilize the voice input in a voice recognition session initiated by the microphone controller, wherein the microphone controller further includes a key store including one or more keys configured to encrypt the received input to encrypted voice data, and one or more application controllers each including one or more decryption keys associated with the one or more keys in the key store, wherein the application controller is further configured to decrypt the voice data utilizing the decryption keys and utilize the decrypted voice data.

According to a second embodiment, a vehicle computer system includes a microphone controller configured to receive voice input and utilize the voice input in a voice recognition session, wherein the microphone controller further includes a key store including one or more keys configured to encrypt the received input to encrypted voice data, wherein the microphone controller is configured to communicate with one or more application controllers each including one or more decryption keys associated with the one or more keys in the key store, wherein the application controller is further configured to decrypt the voice data utilizing the one or more keys and utilize the decrypted voice data.

According to a third embodiment, a vehicle computer system includes a microphone controller configured to receive voice input and utilize the voice input in a voice recognition session, wherein the microphone controller further includes a key store including one or more keys configured to encrypt the received input to encrypted voice data, wherein the microphone controller is configured to communicate with one or more application controllers each including one or more decryption keys associated with the one or more keys in the key store, wherein the application controller is further configured to decrypt the voice data utilizing the one or more keys and utilize the decrypted voice data.

DETAILED DESCRIPTION

Embodiments of the present disclosure are described herein. It is to be understood, however, that disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A public key infrastructure (PKI) may include a set of roles, policies, and procedures needed to create, manage, distribute, use, store and revoke digital certificates, and manage public-key encryption. The purpose of a PKI is to facilitate the secure electronic transfer of information for a range of network activities such as e-commerce, internet banking and confidential email. In the embodiments illustrated below, the PKI may be utilized for communicating voice recognition data between various modules. The PKI may be utilized for activities to confirm the identity of the parties involved in the communication and to validate the information being transferred.

In cryptography, a PKI may be an arrangement that binds public keys with respective identities of entities (such as people and organizations). The binding may be established through a process of registration and issuance of certificates at and by a certificate authority. Depending on the assurance level of the binding, this may be carried out by an automated process or under human supervision. The PKI role that may assure valid and correct registration is called a registration authority. A registration authority may be responsible for accepting requests for digital certificates and authenticating the entity making the request. An entity may be uniquely identifiable within each certificate authority domain on the basis of information about that entity. A third-party validation authority can provide entity information on behalf of the certificate authority.

Figure 1:
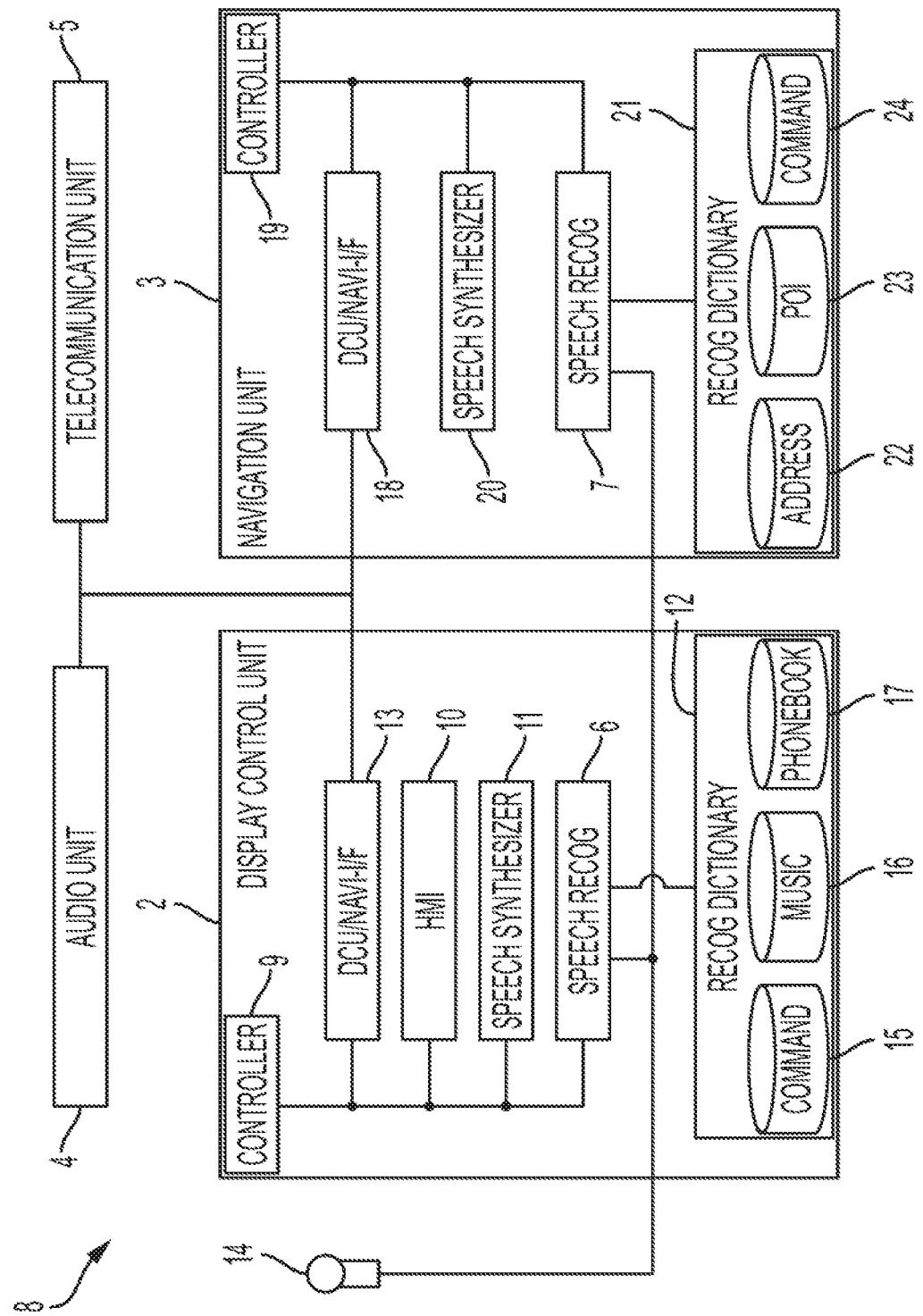
FIG. 1 is a functional block diagram of an example system with voice recognition capabilities.

FIG. 1 illustrates an overview of a system 8 with general voice recognition capabilities. As shown in FIG. 1, the system 8 may be found in a vehicle, such as a motor vehicle, commercial truck, motorcycle, off-road vehicle, etc. The system 8 includes a display control unit (also called DCU hereinafter) 2, a navigation unit 3, an audio unit 4, and a telephone communication unit 5. The DCU 2 and the navigation unit 3, respectively, may include built-in speech recognition apparatuses 6 and 7. The DCU 2 and navigation unit 3 are components of the system 8. The DCU 2 includes a controller 9 (an example of speech recognition controller), a human machine interface 10 (also called HMI hereinafter), a speech synthesizer 11 (text-to-speech (TTS) section) 11, the speech recognition apparatus 6 (voice recognition (VR) section), a recognition dictionary 12, and a display control unit and navigation interface (DCU-Navi I/F) 13. The controller 9 has a function to control each part of DCU 2. The HMI 10 includes a display, an operation part, and a remote control. The operation part includes a touch panel provided on a screen of the display and multiple operation switches provided on a periphery of the screen of the display.

The speech synthesizer 11 may function to convert (synthesize) a text, which is from the controller 9, into speech (speech signal). The synthesized speech is outputted to the controller 9. The synthesized speech is sent from the controller 9 to an audio unit 4 and is outputted as speech via a speaker of the audio unit 4.

The speech recognition apparatus 6 may include a function to use each dictionary of the recognition dictionary 12 to perform speech recognition of speech (analog speech signal) that is inputted via a microphone 14 (analog speech signal). A recognition result is outputted to the controller 9. The recognition dictionary 12 includes a command-usage dictionary 15, a music-usage dictionary 16, and a telephone-phone-usage dictionary 17. The command-usage dictionary 15, the music-usage dictionary 16, and the telephone-phone-usage dictionary 17, respectively, are speech recognition dictionaries corresponding to three data fields, such as commands (various commands for the DCU 2, the navigation unit 3, the audio unit 4, and the telephone communication unit 5), music, and telephone. The recognition dictionary 12 may further include one or more speech recognition dictionaries corresponding to one or more data fields other than the above-described three data fields. The recognition dictionary 12 may include a "wake-word" utilized to activate a voice recognition session with utilizing spoken commands, versus a physical input (e.g., steering wheel switch activation, button press, etc.).

The controller 9 may perform data communications with the navigation unit 3 via the DCU-Navi I/F 13, and a DCU-Navi I/F 18 of the navigation unit 3. The DCU 2 includes an interface (not shown) for performing data communications between the DCU 2 and the audio unit 4 or with the telephone communication unit 5.

As shown in FIG. 1, the navigation unit 3 may include a controller 19, a speech synthesizer 20 (TTS section), a speech recognition apparatus 7 (VR section), a recognition dictionary 21, and a DCU-Navi I/F 18. Furthermore, the navigation unit 3 includes typical configurations of a navigation apparatus, e.g., includes a position detection device for detecting present position of the vehicle, a map data input device for inputting map data and the like, a route calculation device for calculating a route from the present position to a destination, and a route guidance device for performing guidance along the route (each device is not shown).

The controller 19 has a function to control each part of the navigation unit 3. The speech synthesizer 20 has a function to convert (synthesize) a text, which is from the controller 19, into speech (sound signal). The synthesized speech is outputted to the controller 19. The synthesized speech is sent from the controller 19 to the DCU 2 and is outputted as speech via a speaker of the audio unit 4.

The speech recognition apparatus 7 receives through the DCU 2 the speech (analog voice signal) that is inputted via the microphone 14. The speech recognition apparatus 7 has a function to perform speech recognition of this inputted speech using each dictionary of the recognition dictionary 21. A speech recognition result is outputted to the controller 19. The recognition dictionary 21 includes an Address-usage dictionary 22, a point of interest (POI) usage dictionary 23, and a command usage dictionary 24. The Address-usage dictionary 22, the POI usage dictionary 23, and the command usage dictionary 24, respectively, are speech recognition dictionaries corresponding to three data fields, which are addresses, POIs (facility names), and commands (various commands for the navigation unit 3). The recognition dictionary 21 may further include one or more speech recognition dictionaries corresponding to one or more data fields other than the above-described three data fields.

The controller 19 performs data communications with the DCU 2 via the DCU-Navi I/F 18 and the DCU-Navi I/F 13 of the DCU 2. The navigation unit 3 in the present embodiment includes some configurations of a typical navigation apparatus but does not include a particular configuration of the typical navigation apparatus. The particular configuration is a HMI including a display, a touch panel, an operation unit, and a remote control. The navigation unit 3 can utilize the DCU 2 as the HMI of the navigation unit 3.

In this configuration, when the DCU 2 is used as the HMI of the navigation unit 3, a control subject (master control subject) transitions to the navigation unit 3 and the navigation unit 3 controls the DCU 2 (salve control subject). Thereafter, when the navigation unit 3 ends operations (navigation process), the master control subject returns to the DCU 2 and the DCU 2 controls the navigation unit 3 (salve control subject). It is noted that in response to power on the vehicle (in the case of an initial state or normal state), the DCU 2 is the subject controller, so that the DCU 2 controls the navigation unit 3 (e.g., slave control subject).

In a situation where the audio unit 4 is connected to the DCU 2, the DCU 2 may operate as the HMI of the audio unit 4. For example, when a user inputs a name of music by operating the touch panel of the DCU 2 or inputting the speech via the microphone 14, the DCU 2 transmits an instruction to reproduce the music via the audio unit 4. In response to this instruction, the audio unit 4 reproduces the music. In the above case, the DCU 2 may be the master control subject, so that the DCU 2 controls the audio unit 4 (slave control subject).

In a situation where the telephone communication unit 5 is connected to the DCU 2, the DCU 2 operates as the HMI of the telephone communication unit 5. Specifically, when a user inputs a telephone number (or name of a person to whom a call is to be made) by operating the touch panel of the DCU 2 or inputting the speech via the microphone 14, the DCU 2 transmits an instruction to call the telephone number (make a call) to the telephone communication unit 5. In response to the instruction, the telephone communication unit 5 calls the telephone number. In this case, the DCU 2 is the master control subject, so that the DCU 2 controls the telephone communication unit 5 (slave control subject). When a call is made via the telephone communication unit 5, the microphone 14 of the DCU 2 serves as a microphone for the call and the speaker of the audio unit 4 may serve as a speaker for the call. When the telephone communication unit 5 receives an incoming call, an incoming call signal is sent to the DCU 2. Then, in response to the incoming call, the DCU 2 informs the user of the incoming call. When the user selects start of telephone communications, the DCU 2 transmits an instruction to start the telephone communications to the telephone communication unit 5, so as to start the telephone communications.

Figure 2:
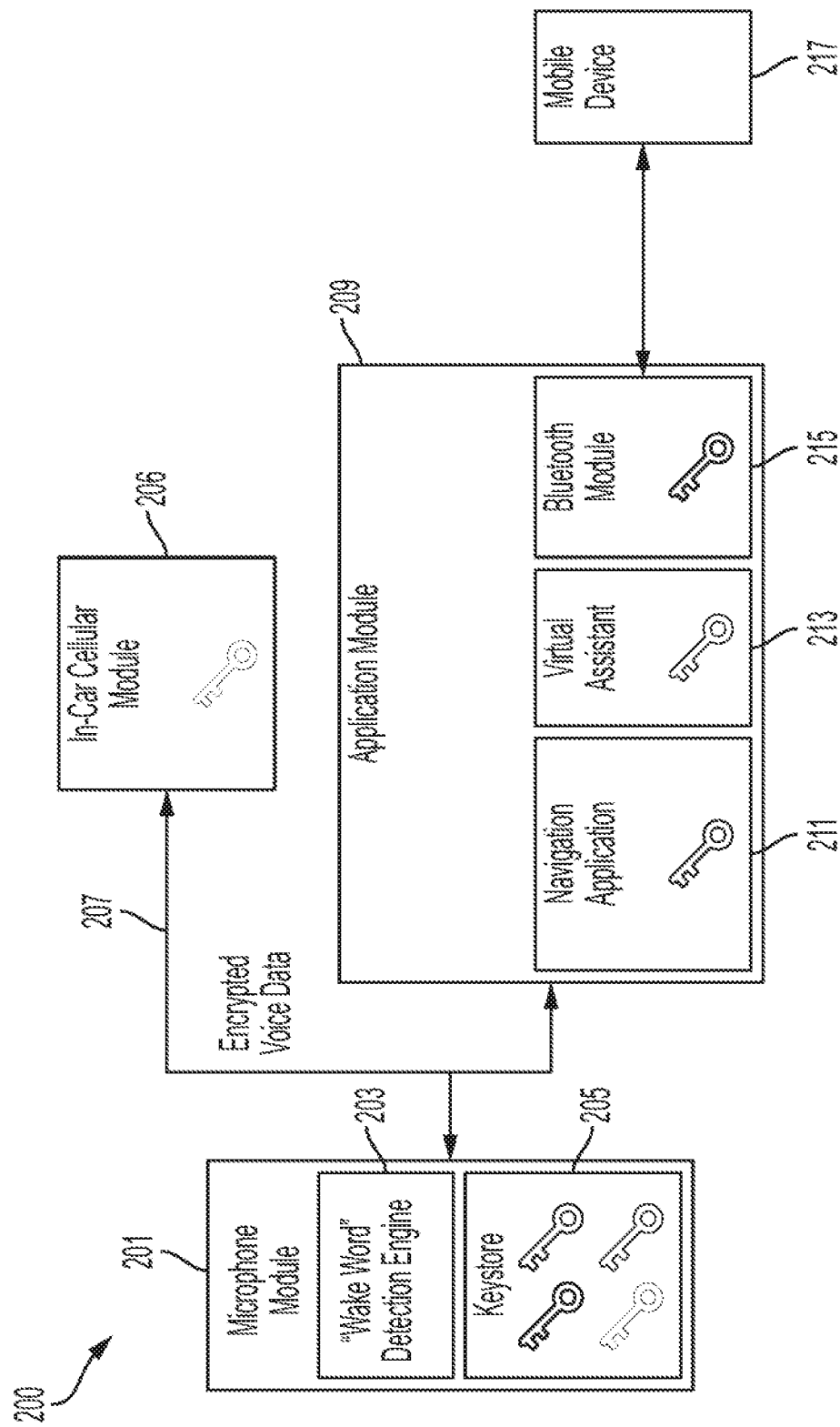
FIG. 2 is a functional block diagram of an example system with voice recognition capabilities that can encrypt and decrypt speech data.

FIG. 2 illustrates a system 200 with voice recognition capabilities that can encrypt and decrypt speech data. The system 200 may be similar to the system of FIG. 1, however, the embodiment of FIG. 2 illustrates various areas of a key store 205, as well as the encryption and decryption keys. The system 200 may include a microphone module 201. The microphone module 201 may be in communication with a vehicle microphone or an auxiliary microphone (e.g., a microphone from an external source such as a mobile device, tablet, phone, etc.). The microphone module 201 may be utilized to initiate a voice recognition session in response to an input or trigger.

The microphone module 201 may include a "wake word" detection engine 203. The detection engine 203 may be utilized to initiate a voice recognition session. A "wake word" may be a word that triggers the voice recognition session without utilizing a mechanical input (e.g., a steering wheel switch or another input). One example of a "wake word" detection engine is the utilization of "ALEXA" in an AMAZON ECHO application, or "HEY SIRI" in APPLE products. The "wake word" detection engine 203 may constantly be listening for voice input in a vehicle cabin.

The microphone module 201 may include the keystore 205. The keystore 205 may include various keys that are utilized to encrypt the voice input from a microphone that is received at the microphone module. The encryption keys 205 may perform a hash on the voice input data to create encrypted voice data for certain embodiments. Thus in certain embodiments, hashing may be performed in addition to the encryption. In such cases, the voice input data may be hashed, and the resulting hash value can be signed using the keys, as a measure of proving the authenticity of the data. This would prevent an attacker from replaying previously captured encrypted voice data. The keys in the keystore 205 that are utilized to encrypt the voice input data may also be utilized to decrypt the encrypted voice data. The keys and the keystore 205 within the microphone module 201 are an atypical location, as the microphone module 201 is not typically configured as a part of a security protocol.

Encrypted voice data 207 may then be transmitted from the microphone module 201 to various devices in the vehicle. For example, the system 200 may include its own in-car cellular module 206 (e.g., a telematics module/telematics system). The cellular module 206 may be utilized to communicate data and other information off-board from the vehicle to the "cloud." The encrypted voice data 207 may be sent to the in-car cellular module 206 to activate functions of a mobile device remotely.

An application module 209 may be part of a vehicle computer system utilized to operate various features of the vehicle. The application module 209 may include a navigation application 211 that is utilized to operate the navigation system of the system 200. The encrypted voice data 207 may be passed to the navigation application 211. The navigation application 211 may include an associated decryption key that is utilized to decrypt the encrypted voice data 207. Thus, when a user speaks a voice command, the voice data is encrypted utilizing the encryption key, and is decrypted utilizing the decryption key. In some embodiments, the same key that is utilized to encrypt the voice data may be utilized to decrypt the encrypted voice data. Thus, the application module 209 may utilize the decrypted voice data to initiate a command on the application module 209 corresponding to the received voice input. For example, a user may speak an address as a voice command. The microphone module 201 may retrieve the voice input and encrypt the voice input (e.g., the spoken dialogue) to encrypted voice data utilizing a key in the keystore 205. The encrypted voice data 207 may be sent to the application module 209 that will be utilizing the encrypted voice data 207. The application module 209, the navigation application 211, or a virtual assistant 213 may then decrypt the encrypted voice data 207. The decrypted voice data may allow the navigation application 211 to decipher the address as a voice command, and thus operate the navigation application 211.

The virtual assistant 213 may also be included with the application module 209. The virtual assistant 213 may be an application that can retrieve information from off-board servers. The virtual assistant 213 may assist with scheduling of a user, weather information, or other personal information. A decryption key may be associated with the virtual assistant 213. The decryption key of the virtual assistant 213 may be symmetrical with those keys of the key store.

A Bluetooth module 215 or handsfree system may be included within the application module 209. The Bluetooth module 215 may be utilized to connect a mobile device 217 (e.g., smart phone, tablet, smart watch, etc.) or another mobile device to the system 200. The Bluetooth module 215 may allow for handsfree operation of the mobile device 217. The Bluetooth module 215 may utilize the microphone module 201 to dial out a particular contact or some other functionality.

In one embodiment, the Bluetooth protocol may include its own type of security mechanism to send data to a mobile device 217 from the Bluetooth module 215. In another embodiment, however, the Bluetooth module 215 may send encrypted data to the mobile device 217. The mobile device 217 may include a key (e.g., a decryption key). The corresponding key on the mobile device 217 may be retrieved to be associated by the keystore 205 via registration or other means. For example, an application may be downloaded onto a mobile phone that associates a decryption key with a key of the keystore 205.

Figure 3:
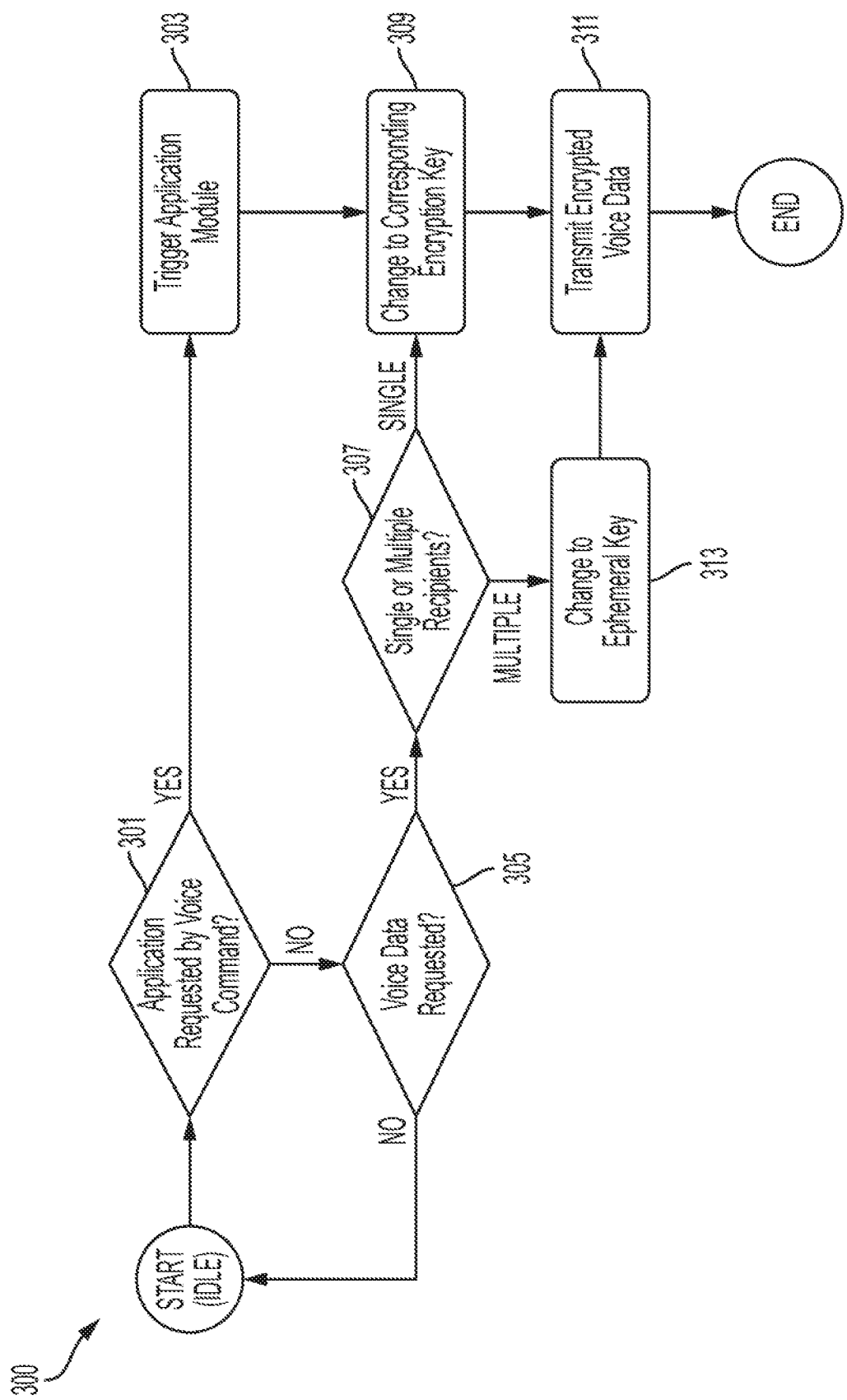
FIG. 3 is a flowchart of the voice recognition system encrypting and decrypting the speech data.

FIG. 3 illustrates a flowchart 300 of the voice recognition system encrypting and decrypting the speech data. The flowchart 300 may be implemented on a vehicle computer system, or a controller, or a processor, such as a voice application controller. The system may be initiated when an application requests a voice application via a voice command at decision 301. The system may include a voice application controller that constantly monitors activation of an input to initiate a voice recognition session. For example, a steering wheel switch or a "wake-word" may be initiated to start the voice recognition session. Of course, other inputs coming from interfaces may be utilized.

At step 303, the system may trigger the application module. The application module may include, for example, the navigation application, virtual assistant application, Bluetooth module (e.g., Bluetooth application), etc. For example, a user may request to load the navigation application or handsfree (e.g., Bluetooth application) utilizing a voice command.

At decision 305, the system may determine if voice data was requested in the circumstance the application was not requested by a voice command. The voice recognition system may work in conjunction with several other applications and controllers in the vehicle, such as those described with reference to FIGS. 1 and 2 (e.g., Bluetooth module, navigation application, etc.). In one example, the navigation application may request utilization of the voice recognition system and/or voice data, and as such, may initiate a voice recognition session.

At decision 307, the system may determine if the voice request has single or multiple recipients. For example, the microphone controller may analyze whether one application or multiple applications have requested to utilize voice data from the microphone controller. In one example, the system may send voice data to multiple recipients, such as a logger to log the voice data utilized and to send the voice data to a smart phone.

At step 309, the system may change to the corresponding encryption key if the recipient is only a single recipient. For example, if the application that calls for the voice data is the navigation application, a key mapped via the key store may be utilized to encrypt the voice data. The encryption key may be utilized to encrypt the voice data prior to subsequent transmission.

At step 311, the system may transmit the encrypted voice data to the recipient application(s) upon being encrypted. Upon receiving the encrypted voice data, the application may utilize the corresponding key (e.g., a decryption key) to decrypt the voice data. In another embodiment, an ephemeral key may be transmitted and utilized to decrypt the encrypted voice data. The ephemeral key may be a unique key derived from a random number generator that is part of the cryptographic engine in the microphone controller. The ephemeral key may be distributed as a part of a key establishment process utilizing the existing keys of the key store to securely distribute the ephemeral key to the recipient application(s) and facilitate subsequent voice data decryption (e.g., utilizing the ephemeral key). The ephemeral key may be transmitted with the encrypted voice data on the same channel or different channel. The ephemeral key may be a unique group-based key utilized to reduce processing and communication bandwidth.

At step 313, the system may utilize an ephemeral key to encrypt the voice data. The ephemeral key may be generated for each execution of a key establishment process. In some cases, the ephemeral key may be used more than once, within a single session (e.g., in broadcast applications) where the sender generates only one ephemeral key as a result of a voice data request. When the ephemeral key is generated and changed, it may then be transmitted to the corresponding application modules to facilitate subsequent voice data decryption (e.g., utilizing the ephemeral key). The system may subsequently transmit the voice data encrypted by the ephemeral key to the recipient. The ephemeral key may be sent on a secondary communication channel, or the same channel as the encrypted voice data. The ephemeral key may be utilized to reduce bandwidth when transmitting the encrypted data to multiple applications.

The processes, methods, or algorithms illustrates herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field Programmable Gate Arrays (FPGAs), state machines, controllers or other hardware components or devices, or a combination of hardware, software and firmware components. The words used in the specification are words of description rather than limitation, and it is understood that various changes can be made without departing from the spirit and scope of the disclosure. For example, the term module may describe a processor, controller, or any other type of logic circuitry that responds to and processes instructions utilized by a computer. Additionally, the term module may be utilized in software to describe a part of a program (or multiple programs) that have routines.

While exemplary embodiments are described above, it is not intended that these embodiments describe all possible forms encompassed by the claims. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle computer system, comprising:
one or more microphones configured to receive voice input;
a microphone configured to receive the voice input and utilize the voice input in a voice recognition session initiated by the microphone controller, wherein the microphone controller further includes a key store including one or more keys configured to encrypt the received voice input to encrypted voice data, wherein the microphone controller is configured to identify whether the voice input requests multiple recipients, wherein the microphone controller is configured to send voice data to multiple recipients in response to requesting multiple recipients; and
one or more application controllers each including one or more decryption keys associated with the one or more keys in the key store, wherein the application controller is a separate controller from the microphone controller and the application controller is further configured to decrypt the encrypted voice data utilizing the decryption keys and utilize the decrypted voice data, wherein the one or more keys configured to encrypt the received voice input is an ephemeral key in response to requesting multiple recipients, and the ephemeral key is sent on a secondary communication channel other than a channel that the encrypted voice data is sent on.

2. The vehicle computer system of claim 1, wherein the one or more application controllers includes a navigation application with a first decryption key and a Bluetooth controller with a second decryption key.

3. The vehicle computer system of claim 1, wherein the microphone controller further includes a wake-word detection engine configured to activate the voice recognition session in response to a wake-word received from the one or more microphones.

4. The vehicle computer system of claim 1, wherein the voice input is analog and the encrypted voice data is digital data.

5. The vehicle computer system of claim 1, wherein the voice input is analog and the decrypted voice data is digital data.

6. The vehicle computer system of claim 1, wherein the one or more keys configured to encrypt the received voice input is symmetrical to the one or more decryption keys.

7. The vehicle computer system of claim 1, wherein the one or more keys configured to encrypt the received voice input is asymmetrical to the one or more decryption keys.

8. The vehicle computer system of claim 1, wherein the ephemeral key is derived from a random number generator of a cryptographic engine in the microphone controller.

9. The vehicle computer system of claim 1, wherein the ephemeral key is generated for each execution of a key establishment process.

10. The vehicle computer system of claim 1, wherein the ephemeral key is utilized more than once within a single session.

11. A microphone controller, comprising:
a processor programmed to receive voice input from one or more microphones in a vehicle, wherein the one or more microphones are configured to be utilized in a voice recognition session initiated by the microphone controller of a vehicle computer system, wherein the microphone controller is configured to identify whether the voice input requests multiple recipients, wherein the microphone controller is configured to send voice data to multiple recipients in response to requesting multiple recipients further includes a key store including one or more keys configured to encrypt the received voice input to an encrypted voice data, wherein the microphone controller is in communication with the one or more microphones and further includes a wake-word detection engine configured to activate the voice recognition session in response to a wake-word input, wherein the microphone controller is a separate controller from the microphone controller and an application controller of the vehicle computer system, wherein the one or more keys configured to encrypt the received voice input is an ephemeral key in response to requesting multiple recipients, and the ephemeral key is sent on a secondary communication channel other than a channel that the encrypted voice data is sent on.

12. The microphone controller of claim 11, wherein the one or more keys include a first encryption key associated with a second decryption key, wherein the second decryption key is located in a vehicle controller that is not the microphone controller.

13. The microphone controller of claim 12, wherein the first encryption key is symmetrical with the second decryption key.

14. The microphone controller of claim 11, wherein the microphone controller is further configured to communicate with one or more vehicle controllers that include one or more decryption keys configured to decrypt the encrypted voice data.

15. The microphone controller of claim 11, wherein the received voice input is analog and the encrypted voice data is digital.

16. The microphone controller of claim 11, wherein the one or more keys configured to encrypt the received voice input is associated with one or more keys configured to decrypt the received voice input.

17. A vehicle computer system, comprising:
a microphone controller in communication with one or more microphones and configured to receive voice input and utilize the voice input in a voice recognition session, wherein the microphone controller further includes a key store including one or more keys configured to encrypt the received voice input to generate encrypted voice data and the microphone controller is located in the vehicle computer system, wherein the microphone controller is configured to identify whether the voice input requests multiple recipients, wherein the microphone controller is configured to send voice data to multiple recipients in response to requesting multiple recipients; and one or more application controllers configured to communicate with the microphone controller, wherein the one or more application controllers include one or more decryption keys associated with the one or more keys in the key store, wherein the application controller is further configured to decrypt the voice data utilizing the one or more keys, wherein the microphone controller is a separate controller from the microphone controller and the application controller, wherein the one or more keys configured to encrypt the received voice input is an ephemeral key in response to requesting multiple recipients, and the ephemeral key is sent on a secondary communication channel other than a channel that the encrypted voice data is sent on.

18. The vehicle computer system of claim 17, wherein the application controller is further configured to utilize the decrypted voice data to initiate a command corresponding to the received voice input, wherein the command is associated with the application controller.

19. The vehicle computer system of claim 17, wherein the voice input is analog and the encrypted voice data is digital.

* * * * *